(12) United States Patent
Koishikawa et al.

(10) Patent No.: US 10,494,045 B2
(45) Date of Patent: Dec. 3, 2019

(54) REFLECTOR MOUNTING STRUCTURE FOR SADDLED VEHICLES

(71) Applicant: HONDA MOTOR CO., LTD., Minato-ku, Tokyo (JP)

(72) Inventors: Takuma Koishikawa, Wako (JP); Shota Yamasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/086,640

(22) PCT Filed: Feb. 2, 2017

(86) PCT No.: PCT/JP2017/003807
§ 371 (c)(1),
(2) Date: Sep. 20, 2018

(87) PCT Pub. No.: WO2017/169093
PCT Pub. Date: Oct. 5, 2017

(65) Prior Publication Data
US 2019/0118889 A1    Apr. 25, 2019

(30) Foreign Application Priority Data
Mar. 30, 2016  (JP) ................. 2016-069595

(51) Int. Cl.
*B62J 15/00* (2006.01)
*B62J 6/20* (2006.01)
*B62K 19/38* (2006.01)

(52) U.S. Cl.
CPC ............ *B62J 6/20* (2013.01); *B62J 15/00* (2013.01); *B62K 19/38* (2013.01)

(58) Field of Classification Search
CPC ............... B62J 6/20; B62J 15/00; B62J 1/14
See application file for complete search history.

(56) References Cited

U.S. PATENT DOCUMENTS

| | | | |
|---|---|---|---|
| 4,479,699 A | 10/1984 | Bolte | |
| 7,832,751 B2 * | 11/2010 | Fischer | B62J 15/00 280/154 |

(Continued)

FOREIGN PATENT DOCUMENTS

| | | |
|---|---|---|
| BE | 361496 | 7/1929 |
| JP | 69-002976 | 1/1984 |

(Continued)

OTHER PUBLICATIONS

International Search Report and Written Opinion for International Patent Application No. PCT/JP2017/003807 dated Apr. 4, 2017, 10 pages.

(Continued)

*Primary Examiner* — Hau V Phan
(74) *Attorney, Agent, or Firm* — Amin, Turocy & Watson, LLP (57) ABSTRACT

A reflector mounting structure includes a fender reinforcement section (13A) that is attached to an inner side surface of a fender which faces a wheel, the fender being configured to cover an outside of the wheel, and a reflector support section (13B) to which a reflector (17) is attached, wherein the reflector support section (13B) and the fender reinforcement section (13A) are formed as an integrated fender assembly (13).

5 Claims, 7 Drawing Sheets

(56) References Cited

U.S. PATENT DOCUMENTS

| | | | | |
|---|---|---|---|---|
| 2003/0121708 A1* | 7/2003 | Laivins | ............... | B62J 15/00 |
| | | | | 180/229 |
| 2005/0068781 A1* | 3/2005 | Nakayama | ........... | B60Q 1/2607 |
| | | | | 362/473 |
| 2009/0001753 A1* | 1/2009 | Clarkson | ............... | B62J 15/00 |
| | | | | 296/78.1 |
| 2016/0101819 A1* | 4/2016 | Iwata | ............... | B62J 1/14 |
| | | | | 280/202 |

FOREIGN PATENT DOCUMENTS

| | | |
|---|---|---|
| JP | 2000-344171 | 12/2000 |
| JP | 2004-106559 | 4/2004 |
| JP | 2015-085743 | 5/2015 |

OTHER PUBLICATIONS

Extended European Search Report for European Patent Application No. 17773642.8 dated Oct. 1, 2019.

* cited by examiner

REFLECTOR MOUNTING STRUCTURE FOR SADDLED VEHICLES

TECHNICAL FIELD

The present invention relates to a reflector mounting structure for a saddle riding vehicle such as a motorcycle or the like.

Priority is claimed on Japanese Patent Application No. 2016-069595, filed Mar. 30, 2016, the content of which is incorporated herein by reference.

BACKGROUND ART

As a saddle riding vehicle including a reflector, a saddle riding vehicle in which a reflecting surface is directed toward a side of a wheel and a reflector is disposed on a fender portion of a front wheel is known (see Patent Literature 1).

In the saddle riding vehicle disclosed in Patent Literature 1, a lateral bulging section (a fender mounting section) that bulges toward a side of a vehicle body extends from the fender that covers an outside of the front wheel, and a support member (a bracket) formed of a metal, which is a coupling section of front forks, is fixed to a back section of the lateral bulging section by bolts. Then, a screw hole is formed in a head section of a bolt configured to fasten the support member to the lateral bulging section, and the reflector is fastened and fixed to the screw hole.

CITATION LIST

Patent Literature

[Patent Literature 1]
Japanese Unexamined Patent Application, First Publication No. 2004-106559

SUMMARY OF INVENTION

Technical Problem

However, since a reflector mounting structure for a saddle riding vehicle disclosed in Patent Literature 1 has a structure in which the reflector is screw-clamped to the head section of the bolt to fasten the support member in the lateral bulging section formed on the fender, there is a concern that a mounting position or a mounting angle of the reflector may become unstable due to a positional deviation, an inclination, or the like, of the bolt.

In addition, in the case of the reflector mounting structure for a saddle riding vehicle disclosed in Patent Literature 1, since the reflector is attached to the lateral bulging section installed on the fender, reduction in size of the fender cannot be easily achieved.

Here, the present invention is directed to providing a reflector mounting structure for a saddle riding vehicle in which a reflector can be accurately assembled to a fender and reduction in size of the fender can be achieved.

Solution to Problem

A reflector mounting structure for a saddle riding vehicle according to the present invention employs the following configurations.

(1) A reflector mounting structure for a saddle riding vehicle according to an aspect of the present invention includes a fender reinforcement section that is attached to an inner side surface of a fender which faces a wheel, the fender being configured to cover an outside of the wheel; and a reflector support section to which a reflector is attached, wherein the reflector support section and the fender reinforcement section are formed as an integrated fender assembly.

In the case of the present invention, since the reflector support section is formed integrally with the fender assembly using the fender reinforcement section mainly, the reflector attached to the reflector support section can be stably attached to the fender with high accuracy. In addition, since the reflector can be accurately attached to the fender without forming a large lateral bulging section on the fender, reduction in size of the fender can be achieved.

(2) In the aspect of (1), the reflector support section may be formed so as to overlap with the reflector when seen in a side view of the vehicle.

In this case, since the reflector support section is hidden by the reflector and is inconspicuous from the outside when seen from a side of the vehicle, an appearance of the vehicle becomes good.

(3) In the aspect of (2), the reflector support section may have a lateral extension region extending outward from the fender reinforcement section in a vehicle width direction at a substantially right angle with respect to a reflecting surface of the reflector.

In this case, when a load is input from a direction substantially perpendicular to the reflecting surface of the reflector, the input load can be received by the lateral extension region of the reflector support section with high rigidity.

(4) In the aspect of (3), the lateral extension region may have a plate-shaped main wall, and a convex section in which a protrusion portion protruding from a planar section of the main wall is continuously formed in the vehicle width direction.

In this case, rigidity of the main wall of the lateral extension region in the vehicle width direction is efficiently increased by the convex section.

(5) In the aspect of any one of (1) to (4), the fender assembly may further include a hose mounting section to which a brake hose is attached, and the hose mounting section may be formed in a back side of the reflector when seen in a side view of the vehicle.

In this case, when the hose mounting section is formed integrally with the reflector support section, a fixed positional relationship between the reflector and the brake hose can be maintained. For this reason, protrusion of the brake hose in a direction of the reflecting surface of the reflector can be avoided. In addition, since the hose mounting section is disposed in the back side of the reflector, the reflector can be used as a piping guide during piping of the brake hose.

(6) In the aspect of any one of (1) to (5), the fender reinforcement section may include a forward extension section extending forward substantially along an inner surface of the fender and a rearward extension section extending rearward substantially along the inner surface of the fender, and a fender receiving section that abuts with the inner surface of the fender may be formed on the forward extension section and the rearward extension section.

In this case, since the forward extension section and the rearward extension section of the fender reinforcement section can support parts of the inner surface of the fender that are spaced apart in the forward and rearward direction with the fender receiving section, deformation of the fender can be efficiently restricted.

Advantageous Effects of Invention

According to the aspect of the present invention, since the reflector support section and the fender reinforcement section are configured as the integrated fender assembly, the reflector can be assembled to the fender with high accuracy without causing an increase in size of the fender.

DESCRIPTION OF EMBODIMENTS

Hereinafter, embodiments of the present invention will be described with reference to the accompanying drawings. Further, directions of forward, rearward, leftward, rightward, and the like in description below are the same as directions in a vehicle described below unless the context clearly indicates otherwise.

In addition, in appropriate places in the drawings used in the following description, an arrow FR showing a forward direction with respect to a vehicle, an arrow LH showing a leftward direction with respect to a vehicle and an arrow UP showing an upward direction with respect to a vehicle are provided.

Figure 1:
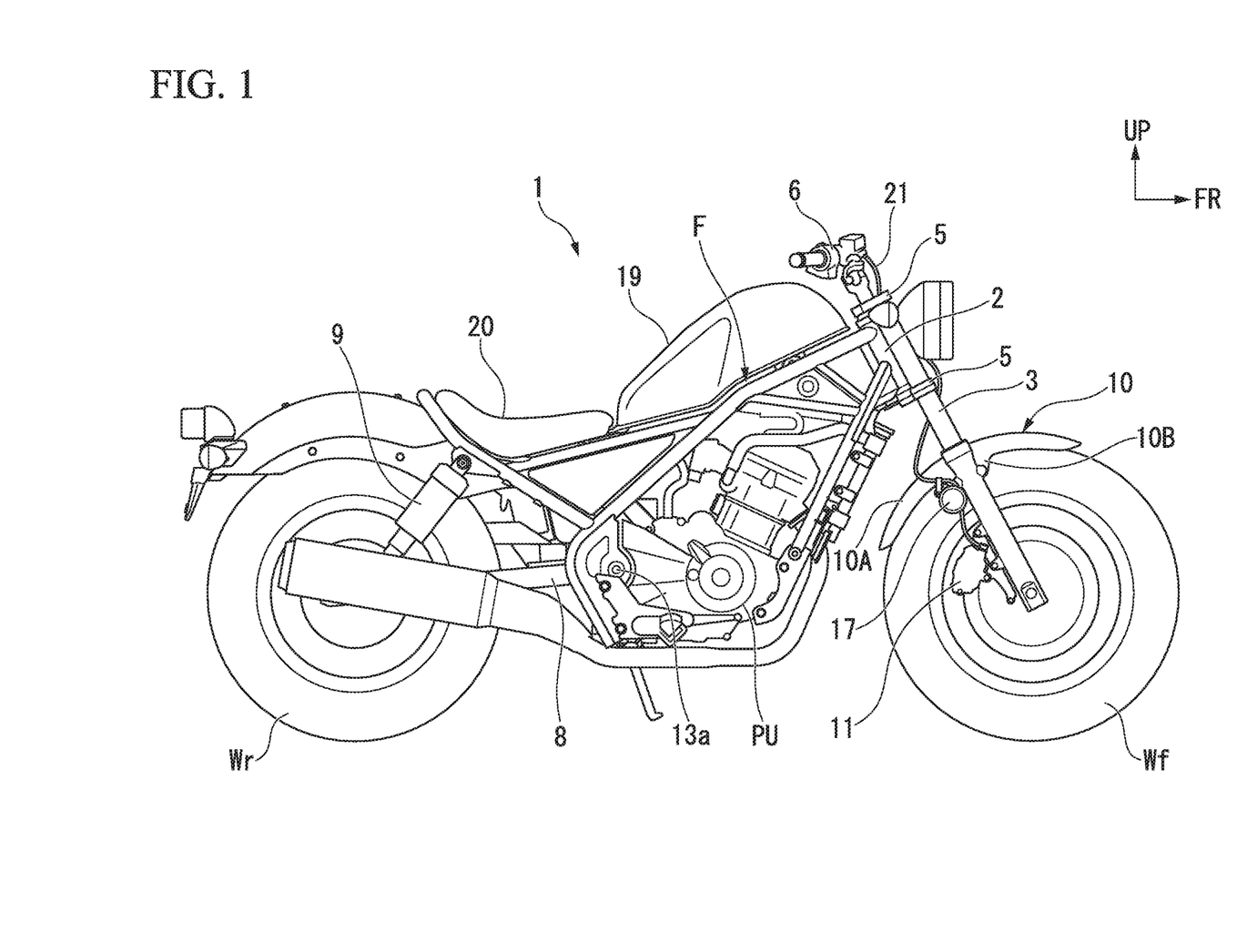
FIG. 1 is a side view of a saddle riding vehicle according to an embodiment of the present invention.

FIG. 1 is a view showing a right side of a saddle riding vehicle according to the embodiment. The saddle riding vehicle according to the embodiment is a so-called cruiser type motorcycle 1 having a small vehicle height and a large forward and rearward length. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the bridge member 5 on the upper side.

A rear wheel Wr of the motorcycle 1 is supported by a rear end portion of a swing arm 8. A front end portion of the swing arm 8 is vertically swingably supported by a pivot section 13a of the vehicle body frame F. The rear wheel Wr is linked to a power unit PU of the motorcycle 1 via, for example, a transmission mechanism using a chain or the like. A lower end portion of a rear cushion 9 that is a suspension part on the side of the rear wheel Wr is connected to the vicinity of the rear wheel support section of the swing arm 8. Further, reference numeral 19 in FIG. 1 designates a fuel tank, and reference numeral 20 designates a seat on which a driver sits.

A front fender 10 configured to cover the front wheel Wf from above is attached to the left and right front forks 3. In addition, a brake caliper 11 of a brake apparatus on the side of the front wheel Wf is attached to the vicinity of a lower end of the front fender 10 on the right side.

Figure 2:
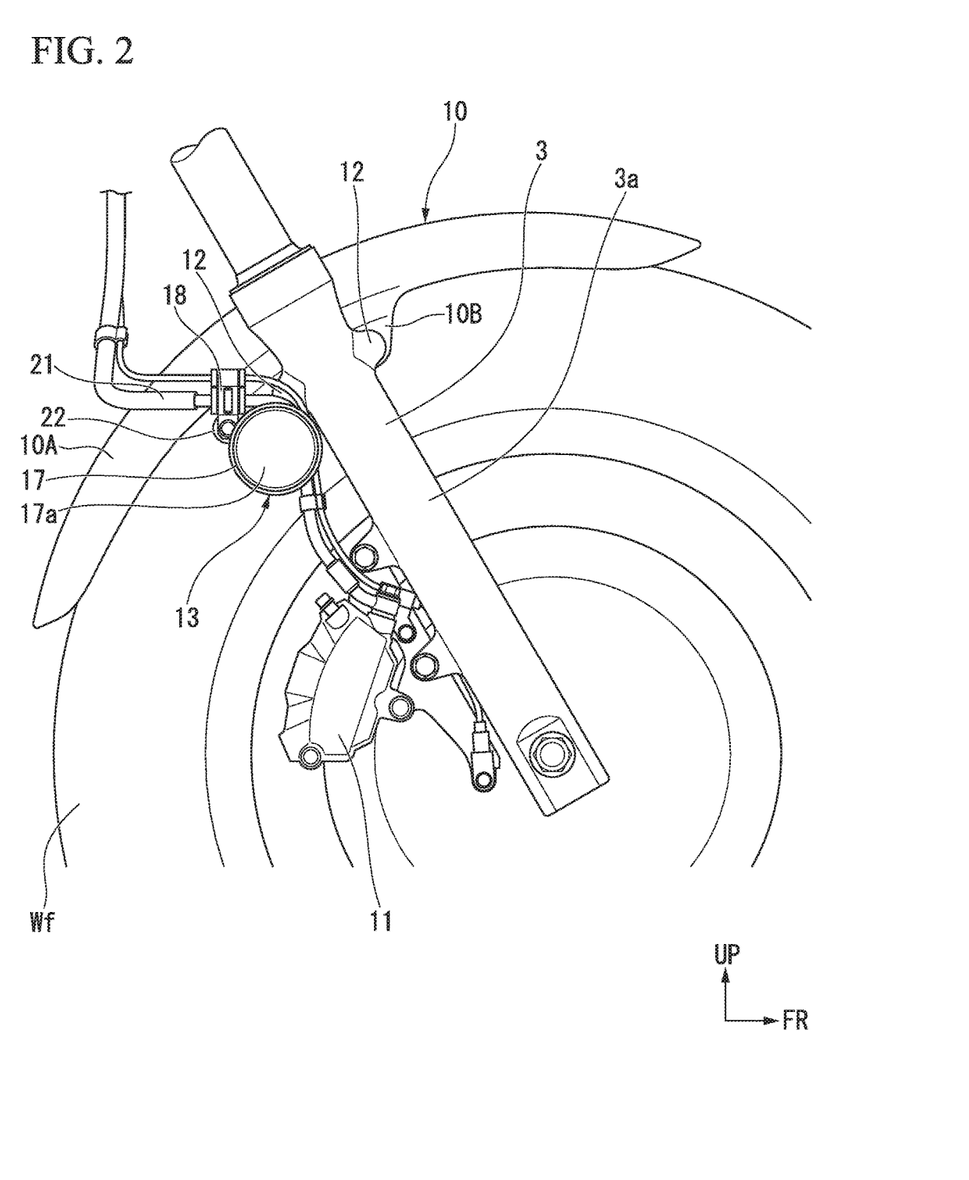
FIG. 2 is an enlarged side view of a part of the saddle riding vehicle according to the embodiment of the present invention.
Figure 3:
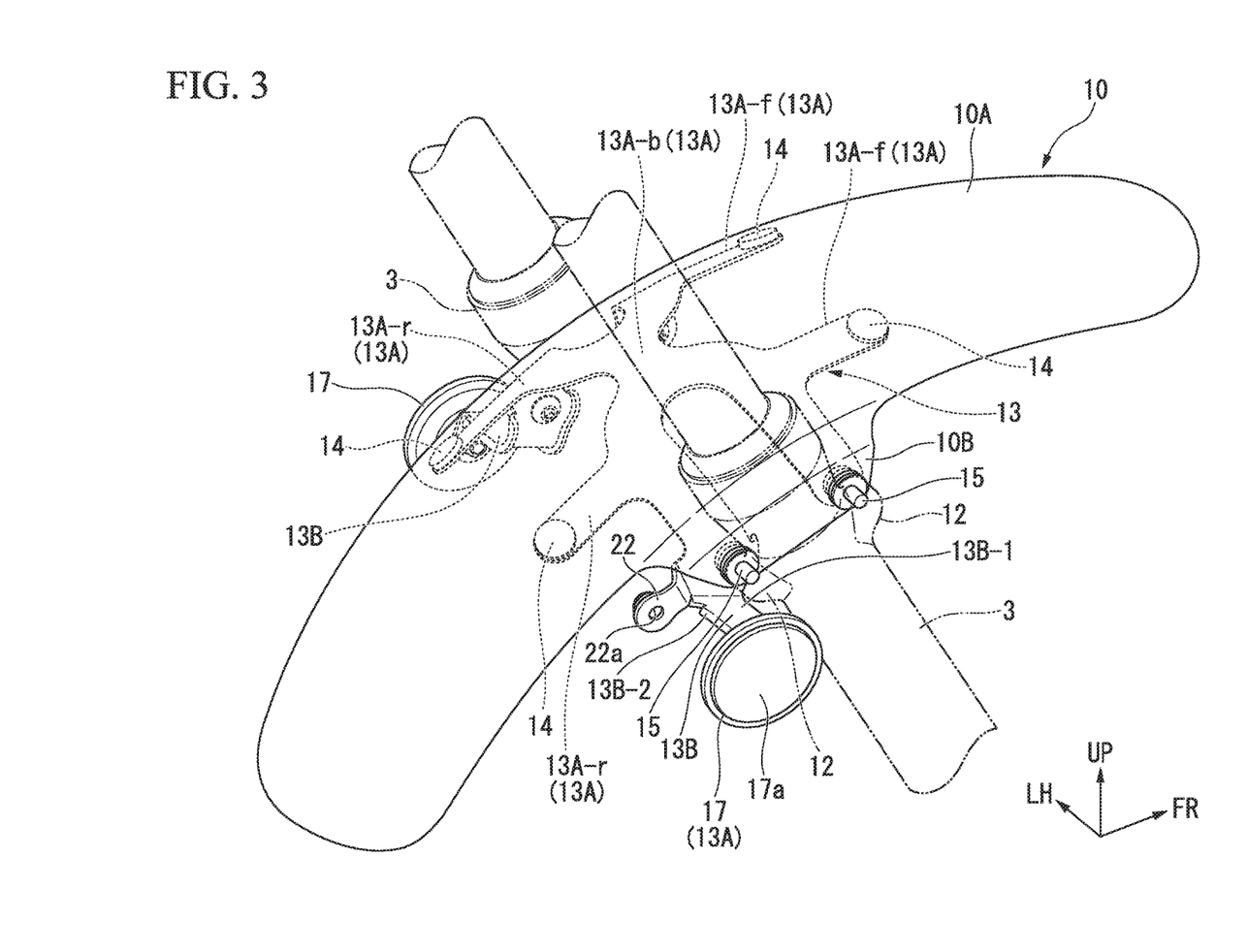
FIG. 3 is a perspective view of a front fender portion of the saddle riding vehicle according to the embodiment of the present invention.

FIG. 2 is an enlarged view showing a support section on the side of the front wheel Wr in FIG. 1, and FIG. 3 is a view showing the front fender 10 when seen from a diagonally right and rear side.

The left and right front forks 3 are constituted by upright type shock absorbers, and outer tubes 3a are disposed below the front forks 3. A pair of front and rear fastening boss sections 12 are installed in the vicinity of upper end portions of the outer tubes 3a. Nuts (not shown) are embedded in the front and rear fastening boss sections 12 and the front fender 10 is fastened and fixed to the nuts.

The front fender 10 is formed in substantially an arc shape substantially along the exterior of the front wheel when seen in a side view. In addition, a cross-sectional shape of the front fender 10 substantially perpendicular to a forward and rearward direction of a vehicle body is formed in an arc shape in which a center in a vehicle width direction bulges upward substantially along a tire cross section of the front wheel Wf. The front fender 10 includes a fender main body 10A configured to cover the front wheel Wf from above and a pair of flange sections 10B extending downward from a substantially center part of the left and right side edge portions of the fender main body 10A in the forward/rearward direction. The left and right flange sections 10B are formed integrally with the fender main body 10A.

A fender assembly 13, mainly consisted by a fender reinforcement section 13A, is attached to a substantially center part of an inner side surface of the front fender 10 in the forward and rearward direction (a surface facing the wheel). The fender assembly 13 is constituted by a metal plate member, and integrally includes reflector support sections 13B to which reflectors 17 are attached.

The reflectors 17 are attached to the front fender 10 via the fender assembly 13 such that reflecting surfaces 17a are directed outward of the front wheel Wf in the vehicle width direction.

Figure 4:
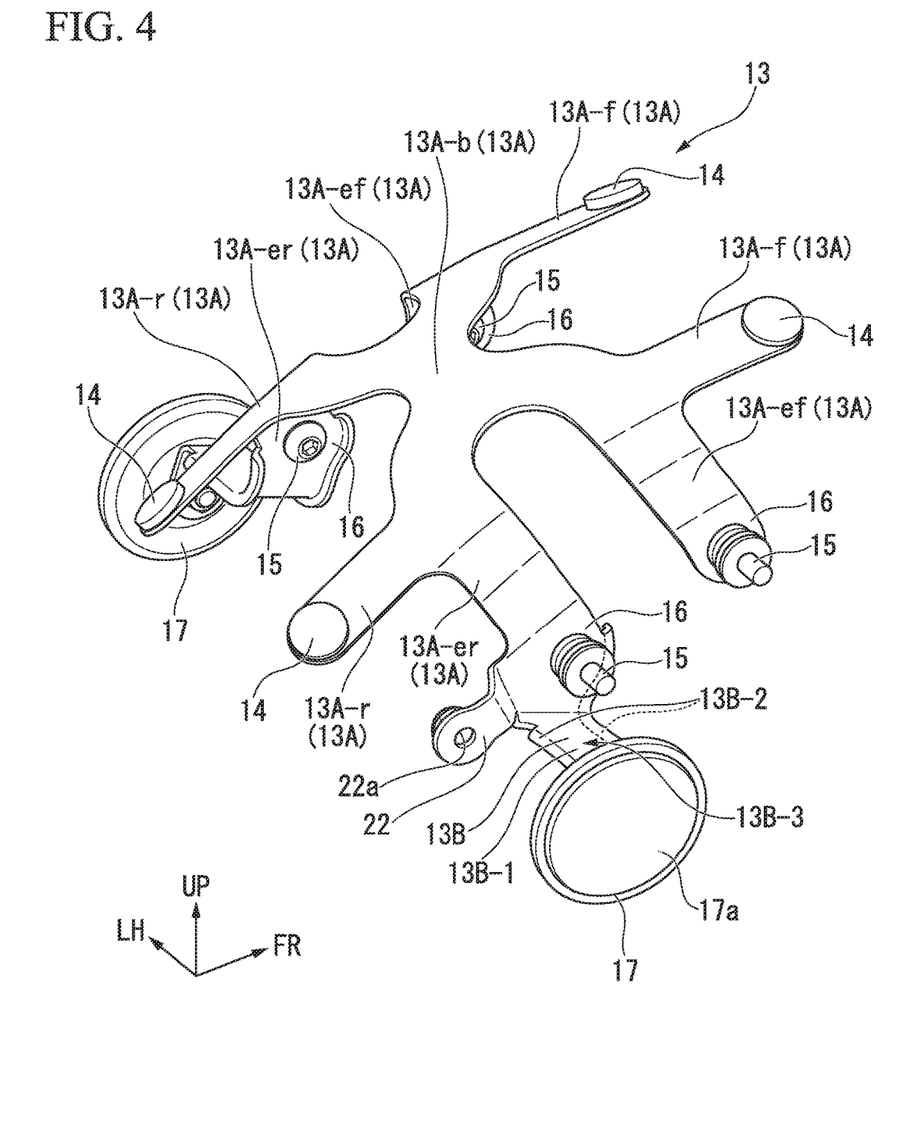
FIG. 4 is a perspective view of a fender assembly according to the embodiment of the present invention.
Figure 5:
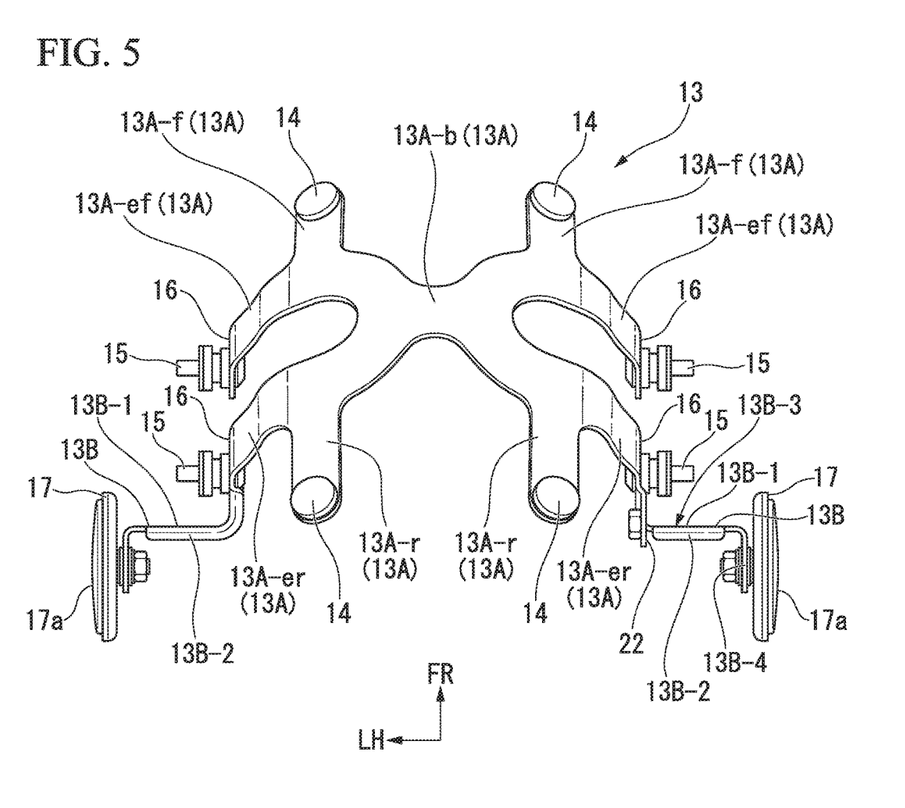
FIG. 5 is a rear view of the fender assembly according to the embodiment of the present invention.

FIG. 4 is a view showing the fender assembly 13 from above a right rear side, and FIG. 5 is a view showing the fender assembly 13 from behind the vehicle body.

The fender reinforcement section 13A of the fender assembly 13 includes a base section 13A-b having an X shape when seen in a plan view, a forward extension section 13A-f extending forward from left and right front end portions of the base section 13A-b substantially along an inner surface of the fender main body 10A, and a rearward extension section 13A-r extending rearward from left and right rear end portions of the base section 13A-b substantially along an inner surface of the fender main body 10A. Fender receiving sections 14 that abut the inner surface of the fender main body 10A are formed on upper surfaces of each of the extension ends of the forward extension sections 13A-f and the rearward extension sections 13A-r.

In addition, a pair of front and rear fastening pieces 13A-ef and 13A-er extending to be curved downward substantially along a cross-sectional shape of the front fender 10 are formed on both of left and right sides of the base sections 13A-b of the fender reinforcement sections 13A. Fastening sections 16 of bolts 15 configured to fix the fender assembly 13 to the flange sections 10B of the front fender 10 are formed on extension ends of the fastening pieces 13A-ef and 13A-er, respectively.

The reflector support sections 13B extending to be curved outward from the rear end portions of the left and right rear side fastening pieces 13A-er of the fender reinforcement sections 13A in the vehicle width direction and having extension ends to which the reflectors 17 are attached are formed integrally with the left and right rear side fastening pieces 13A-er of the fender reinforcement sections 13A. The reflector support section 13B includes a lateral extension region 13B-3 extending outward from a rear end portion of the fastening piece 13A-er of the fender reinforcement section 13A in the vehicle width direction, and a reflector mounting region 13B-4 curved from end portion of the lateral extension region 13B-3 toward below the vehicle body and having an outer side surface to which the reflector 17 is fixed by screw clamps or the like. As shown in FIG. 5, the lateral extension region 13B-3 is formed at substantially right angle with respect to the reflecting surface 17a of the reflector 17 attached to the reflector mounting region 13B-4.

The reflector support section 13B includes a main wall 13B-1 having a flat plate shape, and a reinforcement flange 13B-2 in which front and rear edges of the main wall 13B-1 is curved downward at substantially right angle. In the case of the embodiment, the reinforcement flange 13B-2 constitutes a convex section in which a protrusion portion protruding from a planar section of the main walls 13B-1 is continuously provided along the vehicle width direction.

As shown in FIG. 5, in a state in which the reflectors 17 are attached to the reflector mounting regions 13B-4, the reflector support section 13B is formed to be hidden due to being overlapped with the reflectors 17 at the side behind of the reflectors 17 when seen in a side view of the vehicle body. The lateral extension regions 13B-3 include the main wall 13B-1 and the reinforcement flange 13B-2.

In addition, a hose mounting section 22 configured to hold an intermediate section of a brake hose 21 is formed integrally with an extension end of the fastening piece 13A-er on the right side in the vehicle width direction. The brake hose 21 or the like configured to connect a master cylinder (not shown) on the side of the vehicle body frame F and the brake caliper 11 is held on the hose mounting section 22.

The hose mounting section 22 protrudes at a position of an extension end of the fastening piece 13A-er adjacent to the reflector support section 13B. The hose mounting section 22 is curved from the extension end of the fastening piece 13A-er toward the rear side of the vehicle body, and is formed so as to overlap with a part of the reflector 17 at the side behind the reflector 17 (inside in the vehicle width direction) when seen in a side view of the vehicle body. A screw hole 22a to which a locking tool 18 (see FIG. 2) attached to the intermediate section of the brake hose 21 is fastened and fixed is formed in the hose mounting section 22.

Further, the hose mounting section 22 may not be formed integrally with the fastening piece 13A-er of the fender assembly 13.

Figure 6:
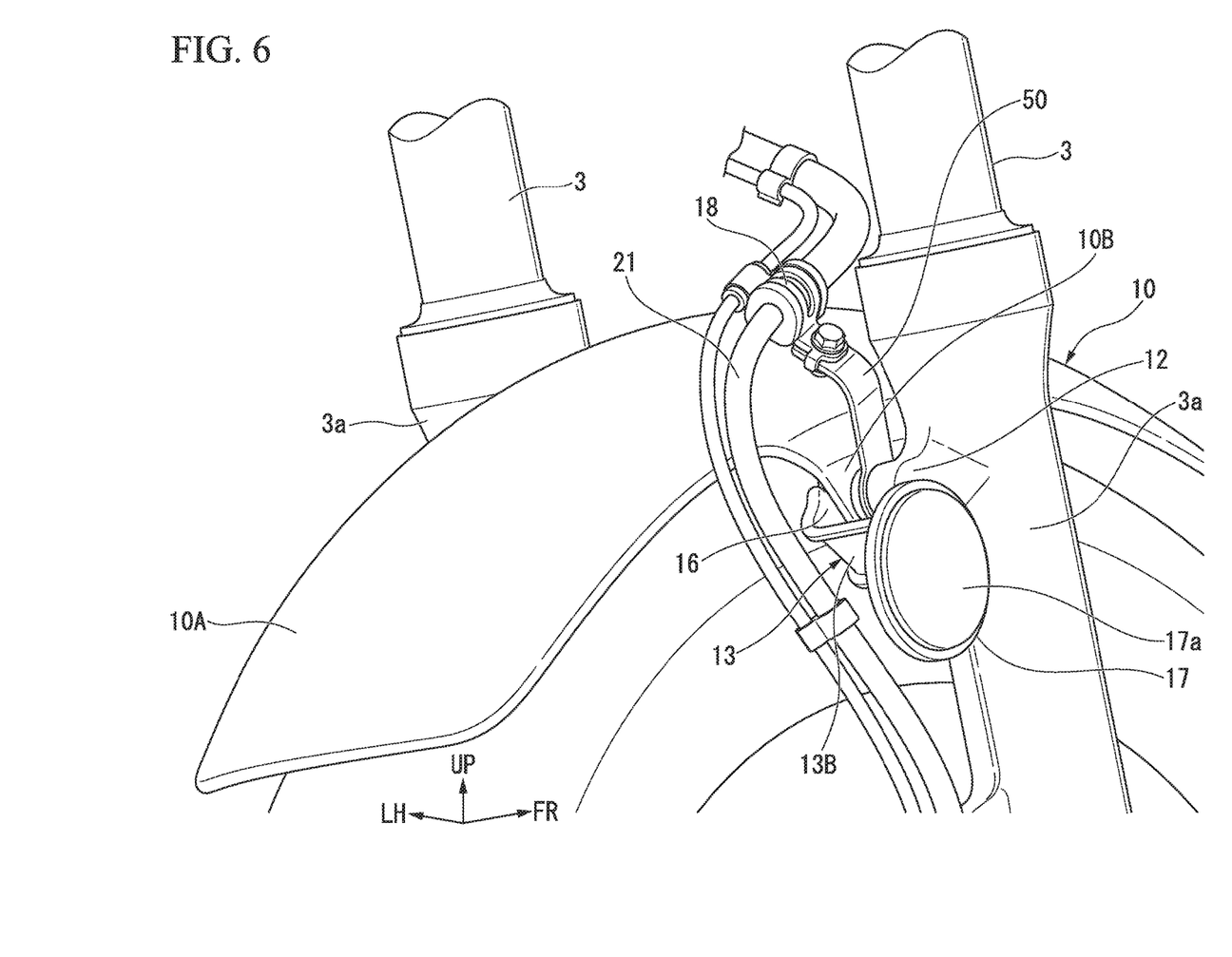
FIG. 6 is a perspective view showing a variant of the saddle riding vehicle according to the embodiment of the present invention.

FIG. 6 is a view showing a variant in which the hose mounting section 22 is not formed on the fastening piece 13A-er of the fender assembly 13. FIG. 6 is a view showing surroundings of the front fender 10 from above a right rear portion. Further, in FIG. 6, the same reference numerals are attached to elements the same as those in the embodiment shown in FIGS. 1 to 5.

In the variant, instead of integration of the hose mounting section with the fastening piece 13A-er of the fender assembly 13, a hose support bracket 50, which is a separate body, configured to hold the intermediate section of the brake hose 21 is provided. The hose support bracket 50 has a base end that is disposed between the fastening boss section 12 of the front fork 3 on the right side and the flange section 10B of the front fender 10, and is fastened and fixed to the fastening boss section 12 together with the flange section 10B. The locking tool 18 attached to the intermediate section of the brake hose 21 is fastened and fixed to a tip portion of the hose support bracket 50.

As described above, in the reflector mounting structure according to the embodiment, the reflector support section 13B is configured integrally with the fender assembly 13 mainly consisted by the fender reinforcement section 13A attached to the inner side surface of the front fender 10, and the reflector 17 is attached to the reflector support section 13B. For this reason, the reflector 17 is stably and accurately attached to the fender assembly 13 attached to the front fender 10 with high rigidity.

In addition, in the reflector mounting structure, in order to attach the reflector 17 to the front fender 10, since a dedicated lateral bulging section does not need to be formed on the front fender 10, reduction in size of the front fender 10 can be achieved.

Accordingly, when the reflector mounting structure according to the embodiment is employed, the reflector 17 can be accurately assembled to the front fender 10 without causing an increase in size of the front fender 10.

In addition, in the reflector mounting structure according to the embodiment, the reflector support sections 13B of the fender assembly 13 are formed so as to overlap with the reflector 17 at the back side of the reflector 17 when seen in a side view of the vehicle. For this reason, when parts of the reflector 17 is seen from a side of the vehicle, the reflector support section 13B is hidden by the reflecting surface 17a of the reflector 17 and is inconspicuous from the outside. Accordingly, when the configuration is employed, it is advantageous in enhancing the appearance of the vehicle.

Further, in the reflector mounting structure according to the embodiment, since the lateral extension region 13B-3 of the reflector support section 13B is formed at a substantially right angle with respect to the reflecting surface 17a of the reflector 17, when a load is input from a direction substantially perpendicular to the reflecting surface 17a of the reflector 17, the input load can be received by the lateral extension region 13B-3 with high rigidity. Accordingly, deformation of the support section of the reflector 17 can be suppressed.

In particular, in the case of the embodiment, the lateral extension region 13B-3 has the reinforcement flange 13B-2 extending from front and rear edges of the main wall 13B-1 having plate shape in the vehicle width direction. For this reason, rigidity of the lateral extension region 13B-3 is efficiently increased by the reinforcement flange 13B-2. Accordingly, when this configuration is employed, deformation of the support section of the reflector 17 during a load input from the side can be more reliably suppressed.

In addition, the reflector mounting structure according to the embodiment integrally includes the hose mounting section 22 on one side of the fender assembly 13, and the brake hose 21 is attached to the hose mounting section 22. Then, the hose mounting section 22 is formed on the side behind the reflecting surface 17a of the reflector 17 when seen in a side view of the vehicle. For this reason, when this configuration is employed, since a fixed positional relationship between the reflector 17 and the brake hose 21 can be maintained, protrusion of the brake hose 21 in a direction of the reflecting surface 17a of the reflector 17 can be avoided.

Further, in the case of this reflector mounting structure is employed, since the hose mounting section 22 is disposed on the behind side of the reflector 17, the reflector 17 can be used as a piping guide during piping of the brake hose 21. Accordingly, piping work of the brake hose 21 can be easily performed.

In addition, in the reflector mounting structure according to the embodiment, the fender reinforcement sections 13A include the forward extension section 13A-f extending forward substantially along the inner surface of the front fender 10 and the rearward extension section 13A-r extending rearward substantially along the inner surface of the front fender 10, and the fender receiving section 14 abutting the inner surface of the front fender 10 is formed at the forward extension section 13A-f and the rearward extension section 13A-r. For this reason, a part of the inner surface of the front fender 10 separated in the forward and rearward direction can be supported by the forward extension section 13A-f of the fender reinforcement section 13A and the fender receiving section 14 of the rearward extension section 13A-r with high rigidity, and deformation of the front fender 10 can be efficiently suppressed.

Further, the present invention is not limited to the embodiment and various design changes may be made without departing from the scope of the present invention.

Figure 7:
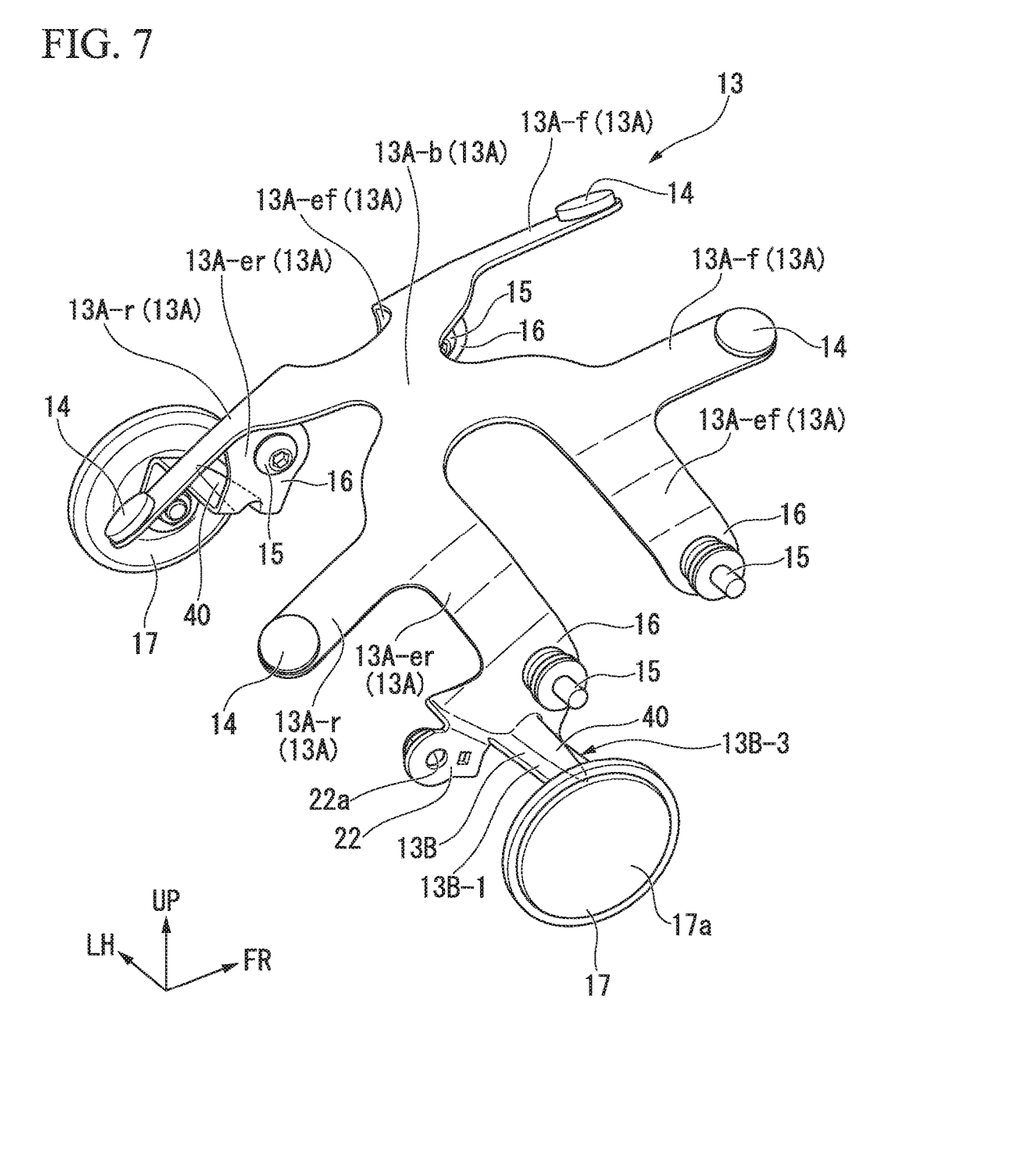
FIG. 7 is a perspective view of a fender assembly according to another embodiment of the present invention.

For example, in the above-mentioned embodiment, the reinforcement flange 13B-2 is formed to be bent at substantially right angle in front of and behind the plate-shaped main wall 13B-1 of the reflector support section 13B. However, as shown in FIG. 7, a reinforcement bead 40 that is continuous with the main wall 13B-1 of the reflector support section 13B in the vehicle width direction may be formed as convex section. In FIG. 7, the same reference numerals are attached to elements the same as those in the embodiment shown in FIGS. 1 to 6.

In addition, the saddle riding vehicle according to the present invention is not limited to a motorcycle (including a motorized bicycle and a scooter type vehicle), and also includes a three-wheeled vehicle (also including a two-front-wheeled and one-rear-wheeled vehicle in addition to a one-front-wheeled and two-rear-wheeled vehicle) or a four-wheeled small vehicle.

REFERENCE SIGNS LIST

1 Motorcycle (saddle riding vehicle)
10 Front fender (fender)
13 Fender assembly
13A Fender reinforcement section
13A-f Forward extension section
13A-r Rearward extension section
13B Reflector support section
13B-1 Main wall
13B-2 Reinforcement flange (convex section)
13B-3 Lateral extension region
13B-4 Reflector mounting region
14 Fender receiving section
17 Reflector
21 Brake hose
22 Hose mounting section
40 Reinforcement bead (convex section)

What is claim is:

1. A reflector mounting structure for a saddle riding vehicle comprising:
   a fender reinforcement section that is attached to an inner side surface of a fender which faces a wheel, the fender being configured to cover an outside of the wheel; and
   a reflector support section to which a reflector is attached,
   wherein the reflector support section and the fender reinforcement section are formed as an integrated fender assembly,
   the reflector support section has a lateral extension region extending outward from the fender reinforcement section in a vehicle width direction at a substantially right angle with respect to a reflecting surface of the reflector, and
   the lateral extension region extends outward in the vehicle width direction beyond the fender.

2. The reflector mounting structure for a saddle riding vehicle according to claim 1, wherein the reflector support section is formed so as to overlap with the reflector when seen in a side view of the vehicle.

3. The reflector mounting structure for a saddle riding vehicle according to claim 1, wherein the lateral extension region has a plate-shaped main wall, and a convex section in which a protrusion portion protruding from a planar section of the main wall is continuously formed in the vehicle width direction.

4. The reflector mounting structure for a saddle riding vehicle according to claim 1, wherein the fender assembly further comprises a hose mounting section to which a brake hose is attached, and
   the hose mounting section is formed in a back side of the reflector when seen in a side view of the vehicle.

5. The reflector mounting structure for a saddle riding vehicle according to claim 1, wherein the fender reinforcement section comprises a forward extension section extending forward substantially along an inner surface of the fender and a rearward extension section extending rearward substantially along the inner surface of the fender, and
   a fender receiving section that abuts with the inner surface of the fender is formed on the forward extension section and the rearward extension section.

* * * * *